US012771673B2

(12) United States Patent
Austin et al.

(10) Patent No.: US 12,771,673 B2

(45) **Date of Patent: *Oct. 20, 2026**

(54) SYSTEMS AND METHODS FOR USER DEFINED NETWORK ENABLED CONTENT FILTERING

(71) Applicants: AT&T Intellectual Property I, L.P., Atlanta, GA (US); AT&T Mobility II LLC, Atlanta, GA (US)

(72) Inventors: Mark Austin, Lucas, TX (US); Shahab Azmoudeh, Dallas, TX (US); Joseph Dorsey, Allen, TX (US); Victor Nilson, Dallas, TX (US); Christopher Sambar, San Antonio, TX (US); Jerald Weber, Newcastle, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 66 days.

This patent is subject to a terminal disclaimer.

(21) Appl. No.: 18/921,134

(22) Filed: Oct. 21, 2024

(65) Prior Publication Data

US 2025/0047644 A1 Feb. 6, 2025

Related U.S. Application Data

(63) Continuation of application No. 18/300,218, filed on Apr. 13, 2023, now Pat. No. 12,155,629, which is a (Continued)

(51) Int. Cl.

*H04L 29/02* (2006.01)

*H04L 9/40* (2022.01)

(52) U.S. Cl.

CPC ...... *H04L 63/0263* (2013.01); *H04L 63/0236* (2013.01); *H04L 63/101* (2013.01); *H04L 63/168* (2013.01)

(58) Field of Classification Search

CPC ............. H04L 63/0263; H04L 63/0236; H04L 63/101; H04L 63/168; H04L 61/1511; H04L 67/42; H04L 67/02

(Continued)

(56) References Cited

U.S. PATENT DOCUMENTS 8,510,303 B2 8/2013 Soroushian et al.
9,524,340 B1 12/2016 Garthwaite et al.

(Continued)

OTHER PUBLICATIONS

Tran , et al., "Cooperative Hierarchical Caching in 5G Cloud Radio Access Networks (CRANs)", IEEE Network—Information Theory: Networking and Internet Architecture; Jul. 2017; 14 pages.

*Primary Examiner* — Glenford J Madamba

(74) *Attorney, Agent, or Firm* — Guntin & Gust, PLC; Kenneth S. Kwan

(57) ABSTRACT

A content filtering system and method includes receiving in a network device in a network from a user device, a user selected set of rules identifying a set of URLs to be blocked. The set of rules are loaded into the network device. The network device receives from the user device a request to access a specified URL. A determination is made at the network device whether the specified URL is in the user selected set of rules. If the specified URL is in the user selected set of rules, then the specified URL is blocked.

20 Claims, 4 Drawing Sheets

Related U.S. Application Data continuation of application No. 17/341,000, filed on Jun. 7, 2021, now Pat. No. 11,658,938, which is a continuation of application No. 16/823,818, filed on Mar. 19, 2020, now Pat. No. 11,050,715, which is a continuation of application No. 15/683,956, filed on Aug. 23, 2017, now Pat. No. 10,708,228.

(58) Field of Classification Search
USPC .......................................................... 709/229
See application file for complete search history.

(56) References Cited

U.S. PATENT DOCUMENTS

| | | | | |
|---|---|---|---|---|
| 2003/0123465 | A1* | 7/2003 | Donahue | H04L 45/34<br>370/401 |
| 2008/0139112 | A1 | 6/2008 | Sampath et al. | |
| 2011/0231892 | A1* | 9/2011 | Tovar | G06F 21/62<br>726/1 |
| 2013/0144750 | A1 | 6/2013 | Brown | |
| 2014/0236969 | A1 | 8/2014 | Nam et al. | |
| 2014/0282816 | A1* | 9/2014 | Xie | H04L 67/06<br>726/1 |
| 2015/0120722 | A1 | 4/2015 | Martín Martínez et al. | |
| 2015/0134781 | A1 | 5/2015 | Silberstein et al. | |
| 2015/0319181 | A1 | 11/2015 | Rao et al. | |
| 2016/0359762 | A1* | 12/2016 | Weinig | H04L 67/51 |
| 2017/0064040 | A1 | 3/2017 | Rykowski | |
| 2018/0205734 | A1* | 7/2018 | Wing | H04L 63/0236 |
| 2023/0254282 | A1 | 8/2023 | Austin et al. | |

* cited by examiner

SYSTEMS AND METHODS FOR USER DEFINED NETWORK ENABLED CONTENT FILTERING

CROSS REFERENCE TO RELATED APPLICATIONS

This application is a continuation of and claims priority to U.S. patent application Ser. No. 18/300,218 filed Apr. 13, 2023, which is a continuation of and claims priority to U.S. patent application Ser. No. 17/341,000 filed Jun. 7, 2021 (now issued as U.S. Pat. No. 11,658,938), which is a continuation of and claims priority to U.S. patent application Ser. No. 16/823,818 filed Mar. 19, 2020 (now issued as U.S. Pat. No. 11,050,715), which is a continuation of and claims priority to U.S. patent application Ser. No. 15/683,956 filed Aug. 23, 2017 (now issued as U.S. Pat. No. 10,708,228). All sections of the aforementioned application(s) and/or patent(s) are incorporated herein by reference in their entirety.

TECHNICAL FIELD

The present disclosure relates generally to systems and methods for filtering content and more specifically systems and methods for user-defined network enabled content filtering.

BACKGROUND

Internet-connected users receive undesirable and harmful content such as malware, unauthorized tracking scripts, advertisements, and offensive content. Advertisements, which may appear benign, are routinely used as vehicles to deliver malware. Serving this undesirable and harmful traffic demands network resources. There are currently only limited options available to attempt to block this content, namely browser plug-ins and network-wide blacklists. Browser plug-ins require that the user be able to install the plug-in on their device, and that the device has compatible hardware and software. Furthermore, substantial network traffic still occurs despite the plug-in potentially blocking ultimate receipt of the content and, as a further disadvantage, the use of browser plug-ins can be detected by websites.

The principle of net neutrality requires that Internet service providers and governments regulating the Internet should treat all data on the Internet the same, not discriminating or charging differentially by user, content, website, platform, application, type of attached equipment, or mode of communication. Currently there is no method of filtering content at the network level that complies with the principles of net neutrality. Network-wide blacklists are disadvantageous because they apply indiscriminately to the traffic of all end users and arguably do not comply with the principle of net neutrality. There is therefore a need for customizable, flexible solutions for content filtering to empower users and improve network performance.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a content filtering method including: receiving in a network device in a network from a user device, a user selected set of rules identifying a set of Uniform Resource Locators (URLs) to be blocked; loading the set of rules into the network device; receiving at the network device from the user device a request to access a specified URL; determining at the network device if the specified URL is in the user selected set of rules; and if the specified URL is in the user selected set of rules, then blocking the specified URL. Other embodiments of this aspect include corresponding computer systems, apparatus, and computer programs recorded on one or more computer storage devices, each configured to perform the actions of the methods.

One general aspect includes a content filtering system that includes a memory that stores executable instructions which cause a device to effectuate operations including: receiving a selection of a filter, wherein the filter is selected from N categories of content filters; determining an applicable domain name system from a plurality of domain name systems that corresponds to the selection; receiving a request to access a specified uniform resource locator; directing the request to the applicable domain name system; and applying the selected filter.

One general aspect includes a computer-readable storage medium including executable instructions that cause a network device executing the executable instructions to effectuate operations including. The computer-readable storage medium also includes executable instructions to effectuate providing a N! domain name systems wherein each of the N! domain name systems provide N categories of content filtering comprising one or more of a malware filter, an objectionable content filter, or a privacy filter loaded as a browser plug-in a smart phone; making a selection in the smart phone of a selected filter from the N categories of content filtering through an application that facilitates the selection; receiving in a network device in a network from the smart phone, the selection; determining an applicable domain name system from the N! domain name systems that corresponds to the selection; receiving at the network device from the smart phone a request to access a specified URL; directing the request to the applicable domain name system; and applying the selected filter . . .

DETAILED DESCRIPTION OF ILLUSTRATIVE EMBODIMENTS

Figure 1:
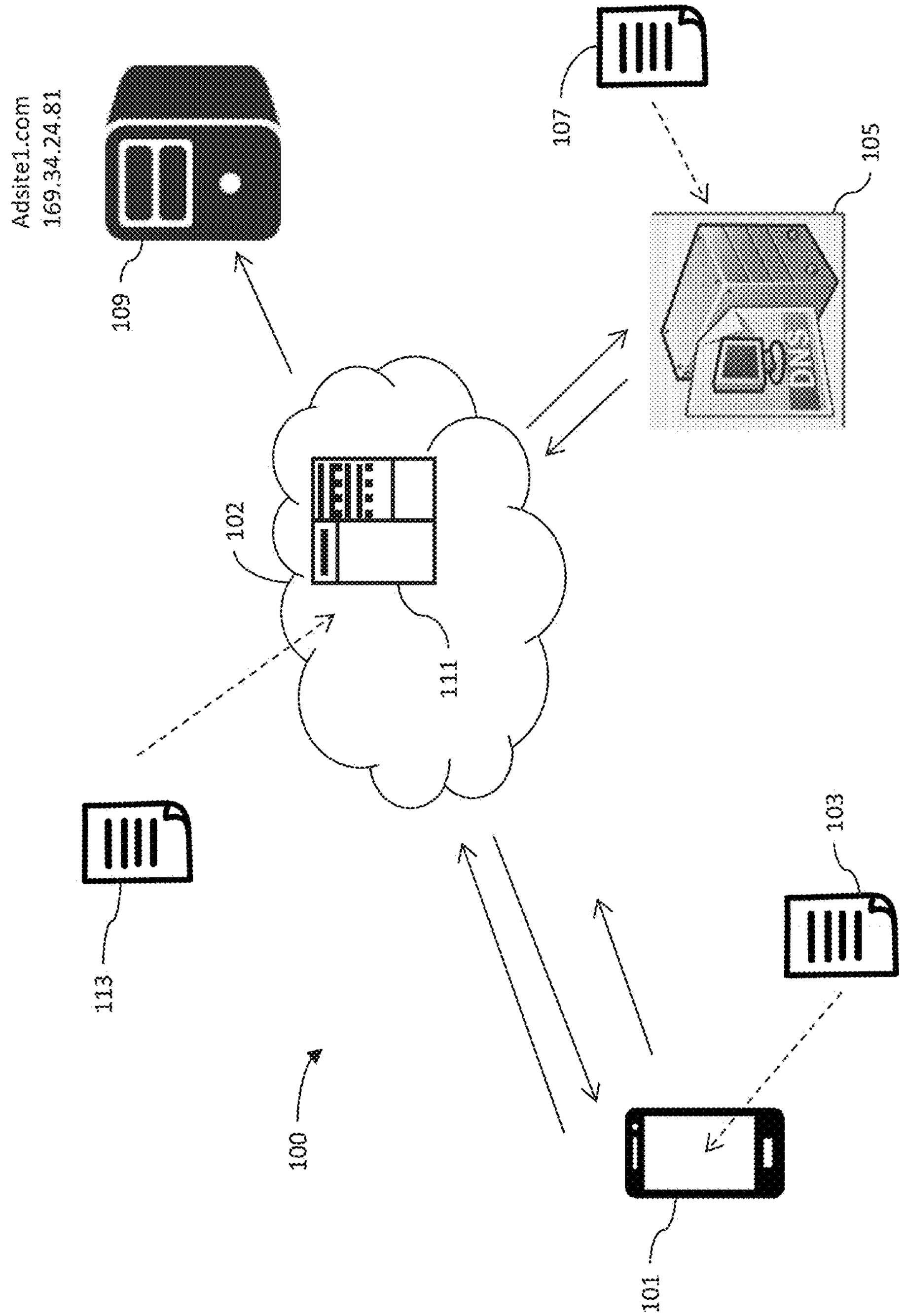
FIG. 1 is a schematic configuration of systems for enabling user defined network enabled content filtering.

FIG. 1 is a schematic configuration 100 of systems for enabling user defined network enabled content filtering. A user device 101 connected to a network 102 may be provided with a set of rules 103 identifying a set of URLs to be blocked. User device 101 may be a desktop computer, a laptop computer, a personal digital assistant, a smart watch, or an equivalent. The network 102 may be the internet, a cellular network connected to the internet or any network connected to the internet.

The user device 101 may access a Domain Name System (DNS) server 105. DNS is a decentralized naming system for computers, services, or other resources connected to the Internet or a private network. It associates certain information with domain names assigned to each of the participating entities. More specifically, it translates a domain name (URL) to the numerical IP addresses needed for locating and identifying computer services and devices with the underlying network protocols. In an embodiment the DNS server 105 may be provided with a user selected set of rules 107. An ad site 109 may be provided which can be accessed through the network 102. The network 102 may be provided with a network device 111 such as a routing server in which a user selected set of rules 113 may be stored.

One embodiment allows the customer to select via an App store like method what type of content filtering they would like such as:

1. Vendor A (e.g. Safe eyes): Porn filtering (i.e. block porn sites from a list of known porn sites);
2. Vendor B (e.g. Symantec): Malware filtering (free);
3. Vendor C (e.g. Norton): Malware filtering ($3/yr cost);
4. Vendor D: (XYZ company): Ad blocking (free);
5: Vendor E: (ABC company): Ad filtering ($10/yr paid to user, will provide some ads);
6: Vendor F: (DEF company): Privacy filtering/blocking ($4/month);

and then to load this list or “rule set” (e.g. using deep packet inspection of content described below) into a smart network which can be implemented using a variety of methods.

In the first method the embodiment implements a smart proxy that looks up what the user has selected for their Internet filtering preferences, and then it applies blocking on anything in their blacklist. For example, a wireless network may have an existing proxy (e.g. a multi-service proxy) which “sees the headers” containing the URL/IP addresses of all packets passing through the wireless network. For http, the URL exists directly; while https packets usually have the Server Name Identification (SNI) provided which essentially is the virtual domain name. SNI is an extension to the Transport Layer Security (TLS) computer networking protocol by which a client indicates which hostname it is attempting to connect to at the start of the handshaking process. Note: even if the domain name is not provided, the destination IP address is available, which can be mapped via cache lookup to a domain-much like a reverse DNS lookup. From the domain names seen, the proxy looks-up the user preferences for filtering, and decides which filter list from the App store they have selected if any, and it applies the blacklist directly by blocking any URL being accessed that is on the blacklists selected by the user. In one embodiment, the “App store” may offer the user “white listing” capability to allow the user to put in any specific URL they would like to pass (and not block), which would be applied afterwards.

In a second embodiment the method may implement a “smart DNS solution” that allows loading of a content filtering list, potentially per user, that would also block undesirable content (e.g. malware, privacy snooping scripts/links, objectionable content, or ad content) according to user preferences. This may be implemented in a few different ways.

One way is to provide a 1-1 mapping of content filtering to DNS’s. Assuming there are N categories of content filtering with one filtering solution per category (e.g. N=3, where N=1 is malware, N=2 is objectionable content, and N=3 is privacy and ad content), then the number of DNS’s each with their own blacklist would be N! (e.g. for N=3, there are 6 unique combinations of blacklists that can be applied).

DNS 1 (IP address 1)—malware filtering
DNS 2 (IP address 2)—adult filtering
DNS 3 (IP address 3)—privacy/ad filtering
DNS 4 (IP address 4)—malware & adult filtering
DNS 5 (IP address 5)—malware & privacy/ad filtering
DNS 6 (IP address 6)—adult & privacy/ad filtering.

In one embodiment, a user device such as a smart phone may be programmed with a DNS (e.g. a smart phone with an android operating system may allow customers to change the DNS, and an App could facilitate the selection of multiple filtering options). The user device may then utilize the correct DNS and the appropriate content filtering will be applied. For example, a user may utilize an App to select to filter adult and privacy/ad content filtering, in which case DNS 6 would be loaded into the device for its DNS. Otherwise the user device can connect to a standard location in the Internet (e.g. the packet gateway in the wireless network) whereby the user’s desired content filtering would be applied by routing the DNS lookup to the appropriate DNS.

Another approach may be to use a common DNS with filtering applied afterwards. Conceptually, many DNS IP addresses could actually point to the same DNS for common lookup, and the DNS IP address itself could be used afterwards to be an indicator in terms of what type of content filtering to apply.

Another method is to apply content filtering anywhere within the flow of information to/from the device to the destination IP address. For example, using deep packet inspection (DPI) along the route between the device and the destination IP address, a DPI solution could inspect the packets, and apply a given content filtering (blacklist) according to user preference. DPI is a form of computer network packet filtering that examines the data part (and possibly also the header) of a packet as it passes an inspection point, searching for protocol non-compliance, viruses, spam, intrusions, or defined criteria to decide whether the packet may pass or if it needs to be routed to a different destination. The use of DPI makes it possible to find, identify, classify, reroute or block packets with specific data or code payloads that conventional packet filtering, which examines only packet headers, cannot detect.

In yet another method a hybrid content filtering solution composed of a combination of a browser based and network solution may be implemented. For example, various anti-blocking approaches may exist that thwart browser-based solutions whereas the network-based content filtering is still in effect. For example, wired.com detects blocking by the browser solution “ad block plus for chrome browser” whereas, network blocking of ads via any of the methods above is currently undetected.

In yet another method a DPI approach may be applied. While all the methods described above consist of lists applying to URLs a more sophisticated approach is to dynamically apply a “rule set” or theme (e.g. block any adult related content) whereby DPI is applied to dynamically inspect content flowing and apply blocking thereafter. Since much of the Internet is now moving to encrypted https, users will likely need to enable the smart network to decrypt their traffic to do such inspection (sharing certificates etc.). Although this type of solution may be computationally intense, it could be applied strategically to inspect any new URLs unknown as to their classification to try and keep up with the correct “undesirable content lists.”

The benefits of the various embodiments are several. The embodiments allow customers to take back control of the Internet to protect themselves from malware, privacy collection applications, and to protect their children from offensive for porn sites, as well as to avoid annoying ads. This is done by allowing the user to select any type of filtering they would like by selecting the filtering solutions that are offered at network operator's smart network content filtering App store. Additionally, the various embodiments allow an ecosystem to be developed and enabled by the network operator's smart network, amongst "content filtering list providers" and users as described above. Another major benefit for users on "content filtering" is eliminating data that they have no desire to have, and helping them manage their overall data usage. Specifically, it has been reported that up to 79% of customer data is due to ads alone. By allowing the users to filter out ads, they can reduce their overall data usage, which would likely make users more satisfied with their service, and subsequently reduce churn. Another advantage is to remove the network operator directly from potentially "owning the content filtering lists" by providing an open "App store like" solution, so that the optional blocking of a URL link is fully in control of the user, and the content filter providers. The network operator simply enables a smart network that allows custom user selected Internet filtering. One can envision potential competition of various content filtering solutions. For example some advertisers such as those from sponsored ads would like to ensure that their ads are not blocked while others could be blocked and those advertisers may compensate users to entice them to load their content filtering lists. A network operator could benefit from this solution as well by charging or getting a revenue share from any content filtering list provider wishing to post on the network operator's content filtering App store.

Figure 2:
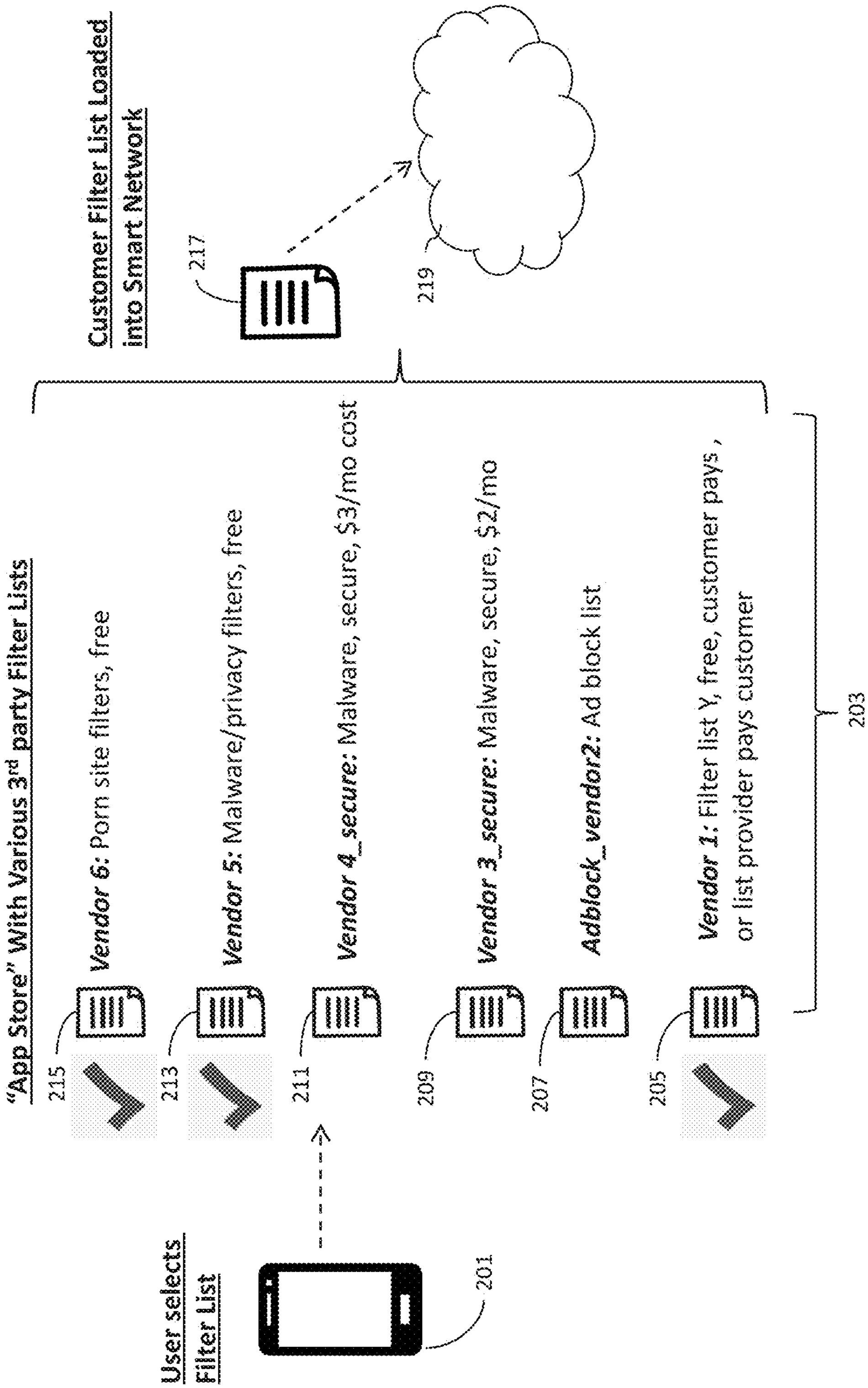
FIG. 2 is an illustration of a user selection of a filter list for enabling user defined network enabled content filtering.

FIG. 2 illustrates an embodiment where the user using user device 201 can select a filter to be applied to certain URLs. For example, the user may access an application (App) store 202 with a number of filtering Apps. Filtering App 205 may be provided with a filter list from Vendor 1. The filter list may include a list of URLs to be blocked. The App may be free, or include a charge to be paid by the user that downloads the App. Alternately the list provider may pay the customer for downloading the App. Filtering App 207 may be provided by Vendor 2 and may include a list of URLs that provide ad content that the user desires to block. App 209 may be provided by Vendor 3 and may include a list of URLs that are the source of malware. App 209 may be offered for download for a fec. Vendor 4 may offer Another security App 211 that may provide protection against malware and may also be downloaded for a fec. App 213 may be provided by Vendor 5 and may provide protection against malware and also provide privacy filters with the application being downloadable at no charge. Finally Vendor 6 may offer App 215 that filters out porn sites and maybe downloadable free of charge. FIG. 2 illustrates that the user may be provided with a menu of Apps that may be selected by the user. In the illustration of FIG. 2 the user may select App 215, at 213, and App 205. By making the selection the user can create a customer filter list 217 that includes a set of rules indicating what URLs should be blocked. The customer filter list 217 may be provided to a smart network 219 for implementation.

Figure 3:
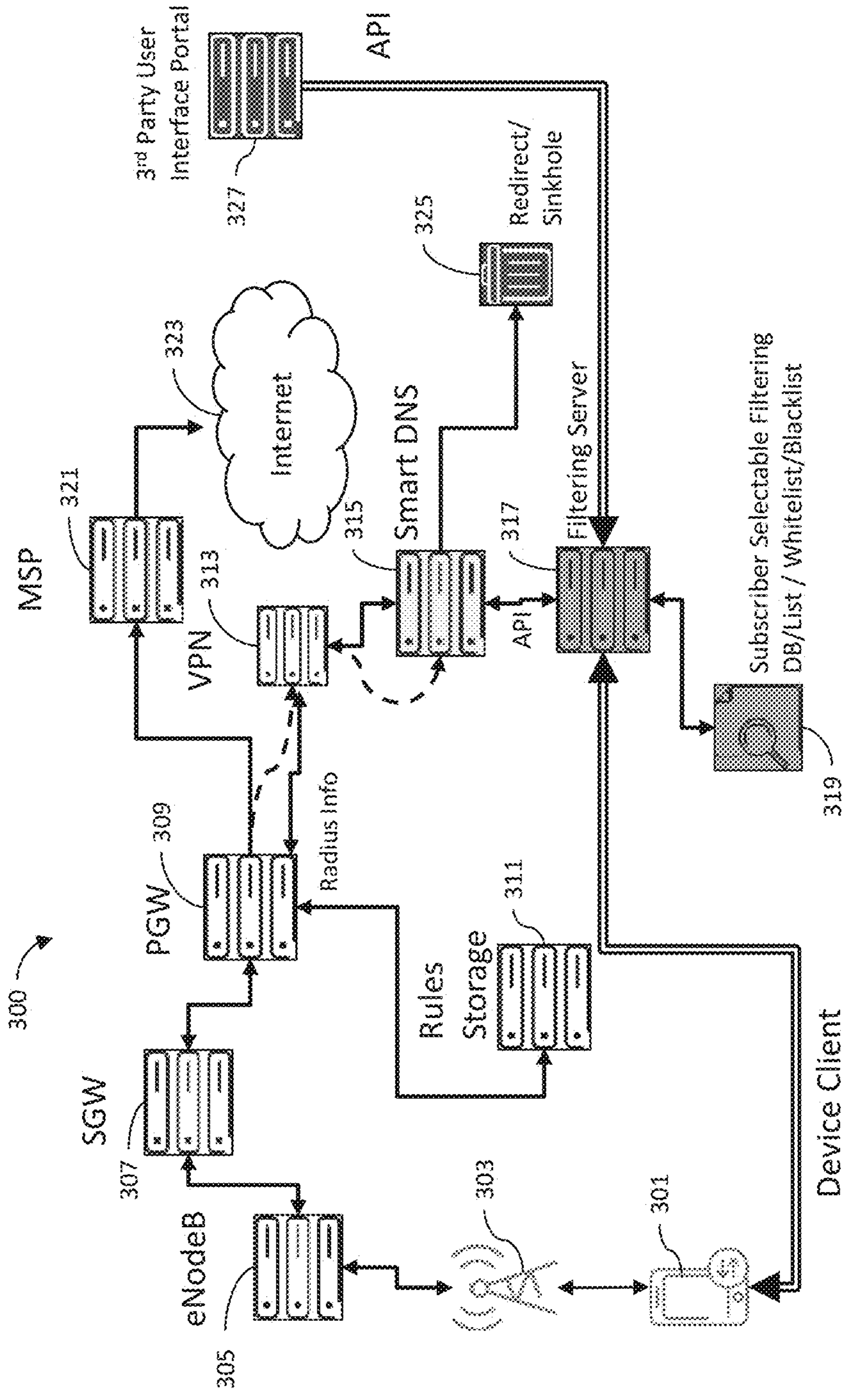
FIG. 3 illustrates a hybrid network that provides user-defined network enabled content filtering.

FIG. 3 is a block diagram illustrating an embodiment of a hybrid network 300 that provides user-defined network enabled content filtering. User device 301 may connect to the network through a cell tower 303 connected to an Enode B 305. Enode B 305 may be connected to a network device such as serving gateway (SGW 307) which is in turn connected to a packet gateway (PGW 309). SGW 307 is the gateway which terminates the interface towards Evolved Universal Terrestrial Radio Access network architecture (E-UTRAN). SGW 307 is responsible for handovers with neighboring eNodeB's and for data transfer in terms of all packets across user plane. PGW 309 is the gateway which terminates the SGi interface which connects the PGW 309 to an external network. In an embodiment PGW 309 may be connected to a rules storage server 311. PGW 309 may also be connected to a virtual private network (VPN) server 313. VPN server 313 may communicate with a smart domain name system server (DNS server 315). DNS server 315 is a computer server that contains a database of public IP addresses and their associated hostnames, and in most cases, serves to resolve, or translate, those common names to IP addresses as requested. DNS servers run special software and communicate with each other using special protocols. DNS server 315 may be connected to a filtering server 317 that includes a subscriber selectable filtering list 319. The subscriber selectable filtering list may include a black list of URLs to be blocked or a white list of URLs to which access is allowed. As shown in FIG. 3, PGW server 309 may be connected to a multi-server proxy 321. Multi server proxy 321 is a server that acts as an intermediary for requests from clients seeking resources from other servers. Multi server proxy 321 may also be connected to the Internet 323. Also shown is a redirect/sinkhole 325 that is connected to the Smart DNS server 315. Redirect/sinkhole 325 is used to spoof DNS servers to prevent resolving host names of specified URLs. This can be achieved by configuring the DNS forwarder to return a false IP address to a specific URL. A third-party user interface portal 327 may provide a set of APIs to the filtering server 317. In alternate embodiments the filtering may be implemented by the SGW 307, the PGW 309, the VPN server 313 or the Smart DNS server 315.

Figure 4:
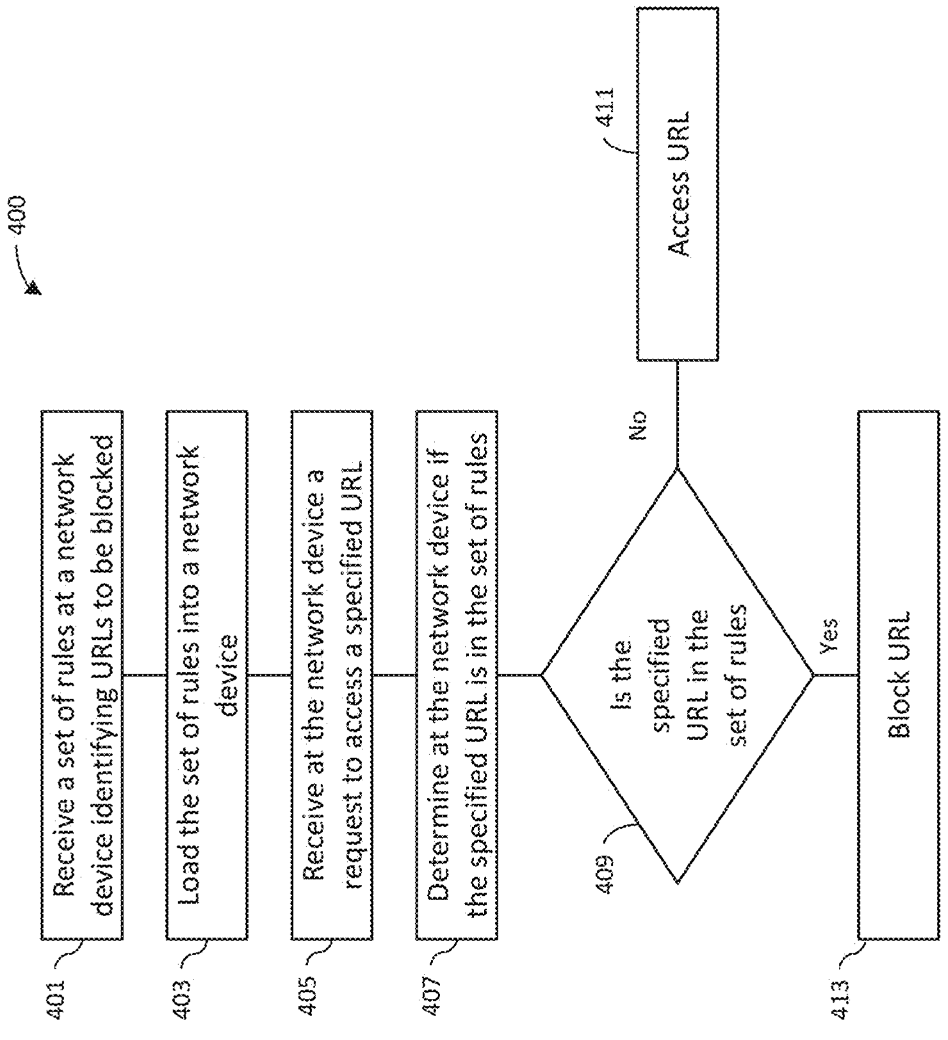
FIG. 4 is a flow chart of a method for providing user-defined network enabled content filtering.

Illustrated in FIG. 4 is a method for providing user-defined, network enabled content filtering (method 400) that may be implemented in a network device such as a smart proxy, a DNS server or a routing element in a path between the user device and the specified URL.

In step 401 the network device receives a set of rules identifying URLs to be blocked. The set of rules may be available from applications accessible through an application store. The set of rules may comprise a one to one mapping of each rule in the user selected set of rules to a unique DNS IP address. The set of rules may also be available from a menu accessible by the user device from a network server.

In step 403 the network device loads the set of rules into the network device.

In step 405 the network device receives a request to access a specific URL.

In step 407 the network device determines if the specified URL is in the set of rules.

In step 409 if the specified URL is not in the set of rules than the network device provides access to the URL in step 411.

In step 409 if the specified URL is in the set of rules in the network device blocks the URL in step 413.

The methods described in the examples may be embodied directly in hardware, in a software module executed by a computer system having a processor, or in a combination of the two. A content filtering system may comprise a network device, and memory coupled to the network device that stores executable instructions to effectuate operations comprising receiving in the network device in a network, from a user device a user selected set of rules identifying a set of URLs to be blocked; loading the user selected set of rules into the network device; receiving at the network device from the user a request to access a specified URL; determining at the network device if the specified URL is in the user selected set of rules; and if the specified URL is in the user selected set of rules, then blocking the specified URL.

A software module may reside in any form of memory or computer readable storage medium such as RAM memory, flash memory, ROM memory, EPROM memory, EEPROM memory, registers, hard disk, a removable disk, a CD-ROM. The memory or storage medium may be coupled to the processor such that the processor can read information from, and write information to, the memory or storage medium. Alternatively, the storage medium may be integral to the processor. The processor and the storage medium may reside in an ASIC. In some aspects, the steps and/or actions of a method may reside as one or any combination or set of codes and/or instructions on a machine readable medium and/or computer readable medium, which may be incorporated into a computer program product.

In any of the exemplary embodiments, the described functions may be implemented in hardware, software, firmware, or any combination thereof. Functions implemented in software may be stored on or transmitted over as instructions or code on a non-transitory computer-readable storage medium. A non-transitory computer readable storage medium may include computer executable instructions embodied in a computer readable storage medium that when executed by the processor of a computer performs the steps of the method. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The previous description of the disclosed examples is provided to enable any person skilled in the art to make or use the embodiments described herein. Various modifications to these examples will be readily apparent to those skilled in the art, and the generic principles defined herein may be applied to other examples without departing from the spirit or scope of the claimed subject matter. Thus, the claimed subject matter is not intended to be limited to the examples shown herein but is to be accorded the widest scope consistent with the principles and novel features disclosed herein.

What is claimed:

1. A method, comprising:

receiving, by a network device, a first access request from a first mobile device to access a specified uniform resource locator (URL);

identifying, by the network device, that the first access request from the first mobile device corresponds to a first content filtering list, wherein the first content filtering list is provided by the first mobile device to the network device and is associated with a content filtering application vendor that advertises content filtering lists with an operator of the network device for user selection;

responsive to a determination that the specified URL is in the first content filtering list, restricting, by the network device, the first mobile device from accessing the specified URL, wherein the restricting is effected via a redirect function;

receiving, by the network device, a second access request from a second mobile device to access the specified URL;

identifying, by the network device, that the second access request from the second mobile device corresponds to a second content filtering list, wherein the second content filtering list is provided by the second mobile device to the network device and is associated with the content filtering application vendor, and wherein the second content filtering list includes a whitelist entry of the specified URL; and responsive to a determination that the specified URL is in the second content filtering list but is included in the whitelist entry of the specified URL, permitting, by the network device, the second mobile device to access the specified URL.

2. The method of claim 1, wherein the network device comprises a domain name server.

3. The method of claim 1, wherein the first content filtering list comprises a set of rules relating to malware.

4. The method of claim 1, wherein the first content filtering list comprises a set of rules for filtering ad content.

5. The method of claim 1, wherein the second content filtering list comprises a set of rules relating to malware.

6. The method of claim 1, wherein the first content filtering list is downloaded by the first mobile device and subsequently provided to the network device for filtering implementation based on a request from the first mobile device.

7. The method of claim 1, wherein the second content filtering list is downloaded by the second mobile device and subsequently provided to the network device along with the whitelist entry of the specified URL for filtering implementation based on a request from the second mobile device.

8. A device, comprising:

a processing system including a processor; and a memory that stores executable instructions that, when executed by the processing system, facilitate performance of operations, the operations comprising:

detecting a first access request from a first mobile device to access a specified uniform resource locator (URL);

identifying that the first access request from the first mobile device is directed to a first Internet Protocol (IP) address that corresponds to a first content filtering list;

responsive to a determination that the specified URL is in the first content filtering list, restricting the first mobile device from accessing the specified URL, wherein the restricting is performed by using a sinkhole operation associated with a domain name server;

detecting a second access request from a second mobile device to access the specified URL;

identifying that the second access request from the second mobile device is directed to a second IP address that corresponds to a second content filtering list; and responsive to a determination that the specified URL is in the second content filtering list, preventing the second mobile device from accessing the specified URL, wherein the first content filtering list is associated with a first content filtering application vendor, wherein the second content filtering list is associated with a second content filtering application vendor, wherein the first content filtering list is downloaded by the first mobile device and subsequently provided to the device for filtering implementation based on a request from the first mobile device, and wherein the second content filtering list is downloaded by the second mobile device and subsequently provided to the device for filtering implementation based on a request from the second mobile device.

9. The device of claim 8, wherein the device comprises the domain name server.

10. The device of claim 8, wherein the first content filtering list comprises a set of rules relating to malware.

11. The device of claim 8, wherein the first content filtering list comprises a set of rules for filtering ad content.

12. The device of claim 8, wherein the second content filtering list comprises a set of rules relating to malware.

13. The device of claim 8, wherein the second content filtering list comprises a set of rules for filtering ad content.

14. The device of claim 8, wherein the first content filtering application vendor and the second content filtering application vendor advertise content filtering lists with an operator of the device for user selection and download.

15. A non-transitory machine-readable medium, comprising executable instructions that, when executed by a processing system including a processor, facilitate performance of operations, the operations comprising:

receiving a first access request from a first mobile device to access a specified uniform resource locator (URL);

identifying that the first access request from the first mobile device corresponds to a first content filtering list, wherein the first content filtering list is provided by the first mobile device to the processing system and is associated with a content filtering application vendor that advertises content filtering lists with a provider of the processing system for user selection;

responsive to a determination that the specified URL is in the first content filtering list, restricting the first mobile device from accessing the specified URL, wherein the restricting is effected via a redirect function or by using a sinkhole operation associated with a domain name server;

receiving a second access request from a second mobile device to access the specified URL;

identifying that the second access request from the second mobile device corresponds to a second content filtering list, wherein the second content filtering list is provided by the second mobile device to the processing system and is associated with the content filtering application vendor, and wherein the second content filtering list includes a whitelist entry of the specified URL; and responsive to a determination that the specified URL is in the second content filtering list but is included in the whitelist entry of the second content filtering list, permitting the second mobile device to access the specified URL.

16. The non-transitory machine-readable medium of claim 15, wherein the processing system is associated with the domain name server.

17. The non-transitory machine-readable medium of claim 15, wherein the first content filtering list comprises a set of rules relating to malware.

18. The non-transitory machine-readable medium of claim 15, wherein the first content filtering list comprises a set of rules for filtering ad content.

19. The non-transitory machine-readable medium of claim 15, wherein the second content filtering list comprises a set of rules relating to malware.

20. The non-transitory machine-readable medium of claim 15, wherein the second content filtering list comprises a set of rules for filtering ad content.

* * * * *